United States Patent [19]
Berg et al.

[11] Patent Number: 5,658,359
[45] Date of Patent: Aug. 19, 1997

[54] METHOD OF OPERATING A FLUIDIZED BED REACTOR SYSTEM, AND SYSTEM FOR CLEANING GAS COOLER

[75] Inventors: Eero Berg, Varkaus, Finland; Charles M. Davis, Waltham, Mass.; Jorma Nieminen, Varkaus; Juha Palonen, Karhula, both of Finland

[73] Assignee: Foster Wheeler Energia Oy, Helsinki, Finland

[21] Appl. No.: 625,078

[22] Filed: Mar. 29, 1996

Related U.S. Application Data

[63] Continuation of Ser. No. 294,540, Aug. 23, 1994, abandoned.

[51] Int. Cl.$^6$ ................................................. C10J 1/00
[52] U.S. Cl. ...................... 48/197 R; 48/203; 48/210; 110/344; 122/2; 122/4 D; 122/379
[58] Field of Search ..................... 48/197 R, 203, 48/204, 206, 210; 122/4 D, 2 R, 379, 395; 1110/344, 345, 346, 347

[56] References Cited

U.S. PATENT DOCUMENTS

| | | | |
|---|---|---|---|
| 1,613,638 | 1/1927 | Altimari et al. | 122/395 |
| 2,665,119 | 1/1954 | Broman | 122/395 |
| 2,809,018 | 10/1957 | Broman | 122/345 |
| 2,949,282 | 8/1960 | Kirby | 122/395 |
| 4,017,272 | 4/1977 | Anwer et al. | |
| 4,057,402 | 11/1977 | Patel et al. | |
| 4,237,962 | 12/1980 | Vandenhoeck | |
| 4,300,625 | 11/1981 | Mikhailov et al. | |
| 4,396,434 | 8/1983 | Forster | 122/379 |
| 4,408,568 | 10/1983 | Wynnyckyj et al. | 122/379 |
| 4,412,848 | 11/1983 | Koyama et al. | |
| 4,444,568 | 4/1984 | Beisswenger et al. | 48/206 |
| 4,603,660 | 8/1986 | Wynnyckyj et al. | 122/379 |
| 4,613,344 | 9/1986 | Henrich et al. | 48/210 |
| 4,670,023 | 6/1987 | Schafer | 48/210 |
| 4,699,632 | 10/1987 | Babu et al. | 48/197 R |
| 4,741,290 | 5/1988 | Krieger et al. | 122/4 D |
| 4,874,397 | 10/1989 | Heitz | 48/210 |
| 4,936,872 | 6/1990 | Brandl et al. | |
| 4,969,930 | 11/1990 | Arpalahti | 110/347 |
| 5,293,843 | 3/1994 | Provol et al. | 122/4 D |
| 5,320,051 | 6/1994 | Nehls | 110/345 |
| 5,355,725 | 10/1994 | Dietz | 122/4 D |

FOREIGN PATENT DOCUMENTS

| | | | |
|---|---|---|---|
| 0 290 213 | 11/1988 | European Pat. Off. | |
| 51407 | 8/1976 | Finland. | |
| 920977 | 12/1954 | Germany. | |
| 1124629 | 3/1962 | Germany | 122/395 |
| 31 25 943 | 4/1982 | Germany. | |
| 31 49 550 | 6/1983 | Germany. | |
| 197708 | 9/1977 | U.S.S.R. | 122/395 |
| WO94/11109 | 5/1994 | WIPO. | |

*Primary Examiner*—Timothy McMahon
*Attorney, Agent, or Firm*—Nixon & Vanderhye

[57] ABSTRACT

In a fluidized bed reactor system having a gas cooler, with cooling surfaces, downstream of a first cyclone separator, the cooling surfaces are cleaned by introducing sufficient concentration of bed particles into the gas during, or just prior to, cooling, so that the particles mechanically dislodge deposits from, and thereby clean, the cooling surfaces. The particles are then removed downstream of the cooler by a second separator, and the bed particles separated by the second separator may be returned to the fluidized bed reactor at or just before the cooler to again be used to effect cooling. Cleaning may be practiced in spaced time intervals only (e.g. periodically or intermittently), or continuously. Where practiced intermittently the efficiency of operation of the first separator may be diminished by introducing a fluid stream, or a solid object, into the vortex flow within the first separator, so that a sufficient number and size of particles pass through the first separator so as to effect cooler cleaning.

18 Claims, 3 Drawing Sheets

METHOD OF OPERATING A FLUIDIZED BED REACTOR SYSTEM, AND SYSTEM FOR CLEANING GAS COOLER

This is a continuation of application Ser. No. 08/294,540, filed Aug. 23, 1994, now abandoned.

BACKGROUND AND SUMMARY OF THE INVENTION

Fluidized bed reactors, particularly circulating fluidized bed reactors, are extremely useful in practicing a wide variety of reactions, such as combustion and gasification of fuel material. Gasification is an attractive way to convert energy of fuel material into a more useful form, producing combustible gas; or combustion of the fuel in the reactor may produce steam to drive a steam turbine. However under many circumstances, the gas is discharged from the reactor (e.g. fuel product gas) may contain undesirable substances such as tar-like condensable compounds. These substances tend to turn sticky below certain temperatures, and therefore deposit or accumulate on surrounding surfaces, particular surfaces of gas cooling devices.

Gasification of solid fuel material in fluidized bed has been discussed in U.S. Pat. Nos. 4,017,272 and 4,057,402. The gasification process is generally stated to be characterized by following reactions:

| | | |
|---|---|---|
| $C + O_2$ | $= CO_2$ | (exothermic) |
| $C + 0.5\ O_2$ | $= CO$ | (exothermic) |
| $C + CO_2$ | $= 2\ CO$ | (endothermic) |
| $C + H_2O$ | $= CO + H_2$ | (endothermic) |
| $C + 2\ H_2O$ | $= CO_2 + 2H_2$ | (endothermic) |
| $C + 2\ H_2$ | $= CH_4$ | (exothermic) |

The product gas usually contains substances which cause difficulties when the gas is cooled, i.e. compounds (e.g. tars) which turn sticky when cooled. The existence of these cause problems in cooling the product gas by depositing or accumulating on heat transfer surfaces of gas cooler. The problem of fouling of gas cooling surfaces has been addressed by using a direct heat transfer system, such as in U.S. Pat. Nos. 4,412,848 and 4,936,872. In these patents the product gas is led into fluidized bed gas cooler, and the fouling components are captured by particles of the fluidized bed.

The use of a separate fluidized bed—as described above—is hardly an ideal solution to the problem, however, since the additional bed consumes space and requires construction and maintenance of different components, which can make costs prohibitive. Using indirect recuperator heat exchangers has also been found unacceptable, however, due to exhaust fouling difficulties. The fouling problem described above is particularly acute under pressurized conditions, e.g. superatmospheric pressure of about 2–50 bars. Under such pressurized conditions conventional steam soot blowers do not work properly. The problems as indicated above do not exist solely during gasification, but also during combustion of a number of different types of fuel in a fluidized bed. For example when brown coal is burned the flue gases contain alkali species which condense on cooling surfaces, accumulating on the surfaces, fouling them, and causing corrosion of surrounding surfaces. Difficulties also occur particularly in the combustion of municipal waste or sludge.

According to the present invention a method and system are provided which overcome the problem of gas particles depositing on (and thereby fouling and perhaps corroding) gas cooling surfaces. The invention solves this problem in a simple yet effective manner. The basic concept behind the invention is to utilize the very same solids which are used as bed material (e.g. inert bed material such as sand and/or reactive bed material such as limestone) to mechanically scrub the gas cooler cooling surfaces so as to prevent accumulation of deposits, and/or remove deposits, therefrom. The invention is applicable to all types of fluidized bed reactors and reactor systems, but is particularly applicable to circulating fluidized bed reactors, and to pressurized systems (that is operating at a pressure of about 2–50 bar, preferably, 2–30 bar).

According to one aspect of the present invention, a method of operating a fluidized bed reactor system comprising a fluidized bed reactor containing solid material particles and for reacting fuel, and a reactor outlet for gas produced during fuel reaction (combustion, gasification, etc.), and a gas cooler having cooling surfaces and connected to the reactor outlet. The method comprises the steps off: (a) Introducing solid material particles, fluidization medium, and fuel into the reactor to provide a fluidized bed therewithin. (b) Reacting the fuel material within the bed to produce exhaust gas and discharging the gas from the reactor outlet. (c) Cooling the gas from the reactor outlet in the gas cooler. (d) Cleaning the cooling surfaces of the gas cooler by introducing a sufficient concentration and size of bed particles into the gas during, or before, step (c), so that the particles mechanically dislodge deposits from, and thereby clean, the cooling surfaces. And, (e) removing the particles from the gas after step (d).

Step (d) is preferably practiced only at spaced time intervals (e.g. intermittently or periodically, or in response to sensing of a decrease in cooling efficiency), but may be practiced continuously. Step (d) is typically practiced by introducing particles separated in step (e) into the gas just before the gas cooler, and/or by introducing so particles from a bed particle supply into the gas just before the gas cooler. Alternatively, or additionally, where the reactor is a CFB reactor having a particle separator between the reactor gas outlet and the gas cooler which normally operates at a first efficiency (which does not allow passage of a sufficient number or size of bed particles therethrough to effect gas cooler cleaning) step (d) is practiced by interrupting operation of the particle separator so that it operates at significantly less than the first efficiency, so that a sufficient number and size of bed particles pass therethrough to effect cleaning of the gas cooler surfaces. This may be done— where the particle separator is a cyclone separator which produces a vortex—by introducing a fluid stream into the vortex to disrupt the vortex flow and thereby reduce separation efficiency, or by introducing a solid object into the vortex, having the same affect. The stream may be steam, air, inert gas, or a liquid. Typically step (b) is practiced to produce gas at a temperature above 600 degrees C., and step (c) is practiced to cool the gas to about 400 degrees C.

According to another aspect of the present invention a circulating fluidized bed reactor system is provided, comprising the following elements: A fluidized bed rector having a bed material inlet, an exhaust gas outlet, and a fluidizing gas inlet. A cyclone separator normally operating at a first efficiency and connected to the reactor gas outlet, and having a gas outlet, and a particle outlet for returning separated bed material to the reactor. A gas cooler connected to the separator gas outlet and having cooling surfaces. And, means for affecting the operating efficiency of the separator so that it is significantly less than the first efficiency so that sufficient bed particles pass through the separator to effect mechanical dislodgement of deposits which form on the cooling surfaces.

The system preferably further comprises pressure vessels surrounding the reactor, separator, and cooler for maintaining them at superatmospheric pressure (e.g. 2–50 bar), and a second separator is preferably provided downstream of the gas cooler for separating bed particles from gas discharged from the cooler, and at spaced time intervals introducing at least some of the separated bed particles into the gas at or just before the cooler.

The means for affecting operating efficiency of the cyclone separator may be means for introducing a fluid stream into the cyclone separator vortex, or for introducing and removing a solid object.

According to yet another aspect of the present invention a circulating fluidized bed reactor system is provided comprising the following elements: A fluidized bed rector having a bed material inlet, an exhaust gas outlet, and a fluidizing gas inlet. A cyclone separator connected to the reactor gas outlet, having a gas outlet, and a particle outlet for returning separated bed material to the reactor. A gas cooler connected to the separator gas outlet and having cooling surfaces. A second cyclone separator downstream of the gas cooler for separating bed particles from gas discharged from the cooler, and including a particle discharge. And, a conduit extending from the second cyclone particle discharge to the gas cooler or to between the first separator and the gas cooler.

It is the primary object of the present invention to avoid the problem of gas cooler surface fouling in fluidized bed reactors in a simple yet effective manner. This and other objects of the invention will become clear from an inspection of the detailed description of the invention, and from the appended claims.

DETAILED DESCRIPTION OF THE DRAWINGS

Figure 1:
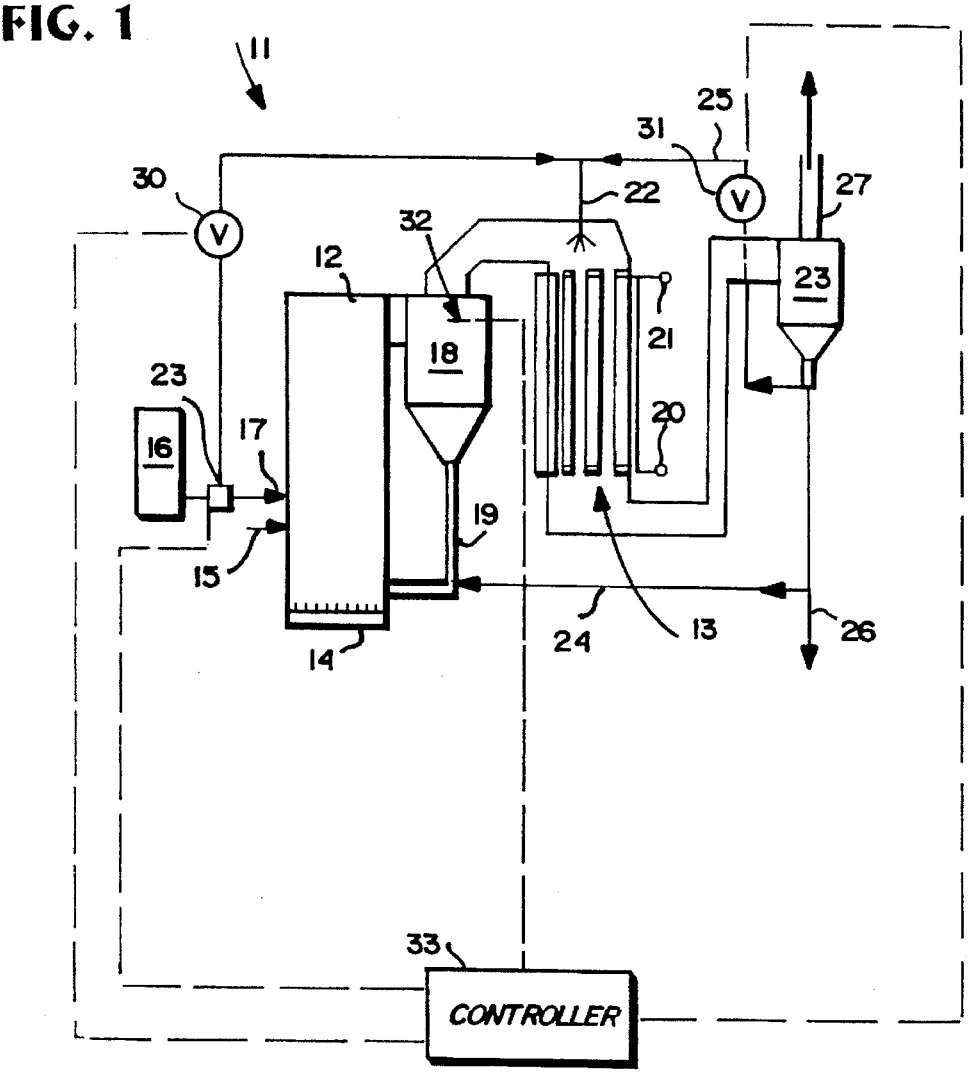
FIG. 1 is a schematic view of a first exemplary embodiment of a circulating fluidized bed reactor system according to the present invention.

FIG. 1 illustrates a circulating fluidized bed (CFB) gasification reactor system 11 according to the present invention, including a circulating fluidized bed reactor 12 and a gas cooler 13. Gasification is practiced in the reactor 12 by introducing fluidized gas through a plenum 14 at the bottom of the reactor 12. Solid fuel material is introduced into the reactor 12 via an inlet 15, and solid bed material particles are introduced from a storage vessel 16 via inlet 17. The solid bed material may be an inert material such as sand, and may also comprise active material (that is active in the gasification process, such as limestone or other sulfur oxide reducing agents).

The fuel material introduced at 15 is reacted (gasification in the case of FIG. 1, but combustion or other reactions are also within the scope of the invention) to produce an exhaust gas which is discharged from an outlet (unnumbered) adjacent the top of the reactor 12 and connected to a first cyclone separator 18. The gas produced during the reaction in reactor 12 exhausts from the reactor 12, and includes in it entrained particulates such as inert solid bed particles, and unreacted fuel material. The vast majority of the particles— particularly the large particles—are separated from the exhaust gas by the separator 18, and are returned by conduit 19 to the bottom of the reactor 12, as is conventional per se.

The product gas which exhausts the separator 18 passes to the gas cooler 20. Typically the exhaust gas from the reactor 12 and separator 18 has a temperature above 600 degrees C., and the cooler 13 is typically designed to cool the gases to about 400 degrees C. In the FIG. 1 embodiment the gas cooler 13 is a fire-tube cooler in which the gas flows inside a plurality of spaced tubes. The space between the tubes is used as a conduit for heat transfer medium to extract heat from the gases. The heat transfer medium is introduced into the cooler 13 via inlet 20, and passes out via outlet 21. Water tube heat transfers surfaces may be utilized too, in which case the gas flows outside the heat transfer surfaces.

As the gas in the gas cooler 13 is cooled, tar-like substances condense or turn sticky and therefore tend to accumulate on the surfaces of the cooler 13. According to the present invention the surfaces are kept clean, or cleaned after accumulation of deposits, by introducing solid particles into the gas flow in, or just before, the cooler 13. For example this may be accomplished by injecting clean particles using injection device 22, the clean bed particles being provided from the source 16 (e.g. comprising sand). A flow controller 23 may be provided for controlling the flow of particles to the injecting device 22 and into the line 17. While injection can take place continuously, it is preferred that it be at spaced time intervals, for example either intermittently or periodically, when it is expected that the layer of condensed and/or sticky material has deposited on the clean surfaces. Alternatively, control may be automatic, e.g. in response to sensing of a decrease in cooling efficiency as a result of depositing of condensing or sticky substances.

Downstream of the gas cooler 13 is a second cyclone separator 23. The second separator 23 may operate continuously, but is particularly necessary when particles are introduced (e.g. through injector 22) to effect cleaning. Particles separated by the second separator 23 may either be returned to the reactor 12 as indicated by line 24, may pass to the injector 22, and/or may be disposed of as indicated by line 26. The product gas in line 27, discharged from the second separator 23, may be filtered, and then acted upon, or may be used directly, depending upon the desired use and the gas's composition.

FIG. 1 also illustrates exemplary conventional control valves 30, 31 which are operatively connected to the source of clean bed particles 16 and particles discharged from separator 23, respectively. A means 32 for lowering the particle separation efficiency of the first separator 18 is also shown schematically in FIG. 1. All of the elements 23, 30, 31, and 32 may be controlled by suitable automatic means, such as a conventional computer controller 33, so as to time, and control the volume of, the particles used for cleaning.

Figure 2:
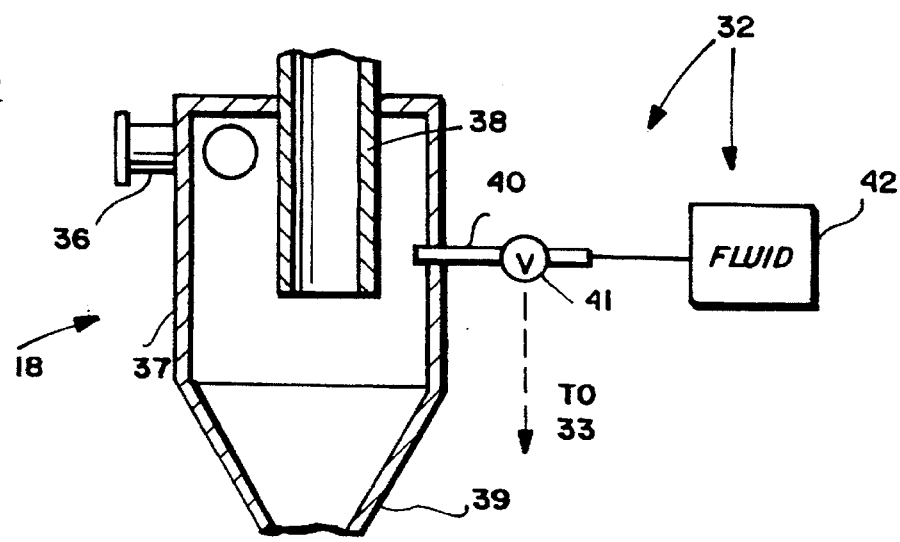
FIG. 2 is a detail side cross-sectional view of the first cyclone separator of the apparatus of FIG. 1, illustrating means for affecting the operating efficiency of the separator.

The device 32 of FIG. 1 is illustrated schematically, but in more detail, in FIG. 2 in association with the first separator 18. An inlet 36 off-center with respect to the axis of the main body 37 of the separator 18, is connected to the gas outlet from the reactor 12, and introduces the gas and particle mixtures in a vortex flow, going around the vortex finder 38.

The tapered bottom of the structure 37 is indicated by reference numeral 39, and is connected to the particle recirculation line 19. In the FIGURE 2, embodiment, the means 32 for affecting the operating efficiency of the separator 18 comprises a fluid conduit 40 with a valve 41 controlled by the controller 33 therein, and connected up to a source of fluid 42 under pressure. The fluid in the source 42 may comprise steam, air, an inert gas such as nitrogen, or a liquid. The conduit or injector 40 is positioned so as to introduce fluid from the source 42—when the valve 41 is opened by is the controller 33—so that it disrupts the vortex flow within the separator 18, and thereby reduces the separator efficiency, causing a significant number of relatively large particles to pass with the gas flowing through the vortex finder 38 to the gas cooler 13.

During normal operation of the separator 18 its particle removal efficiency is such that insufficient number and size of particles pass to the cooler 13 to effect cleaning of the cooler surfaces by mechanically dislodging deposits therefrom. However when the particle removal efficiency of the separator 18 is adversely affected by introducing fluid through conduit/nozzle 40, sufficient particles do pass through the separator 18 so that—either alone, or supplemented by particles from the source 16 and/or from the line 25—can effect cleaning.

Figure 3:
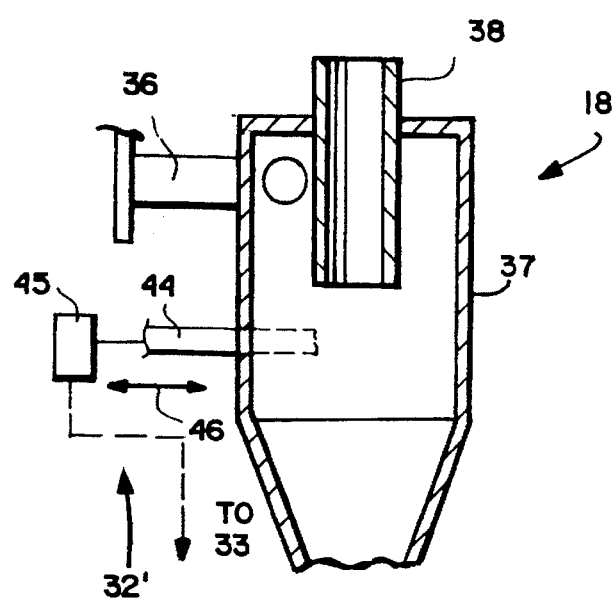
FIG. 3 is a view like that of FIG. 2 only illustrating a different embodiment of the efficiency-affecting means.

FIG. 3 illustrates another exemplary embodiment of the means for adversely affecting separator efficiency. In this case the means are indicated by reference numeral 32', and comprise a solid object—such as a metal bar—44 which is operated by a pneumatic of hydraulic cylinder 45, or other linear actuator, to move in the dimension of arrow 46. The bar 44 may be moved out of contact with the vortex flow in the separator 18—as indicated at solid line in FIG. 3—or, when it is desired to adversely affect separator efficiency, may be moved to the dotted line position illustrated in FIG. 3.

Figure 4:
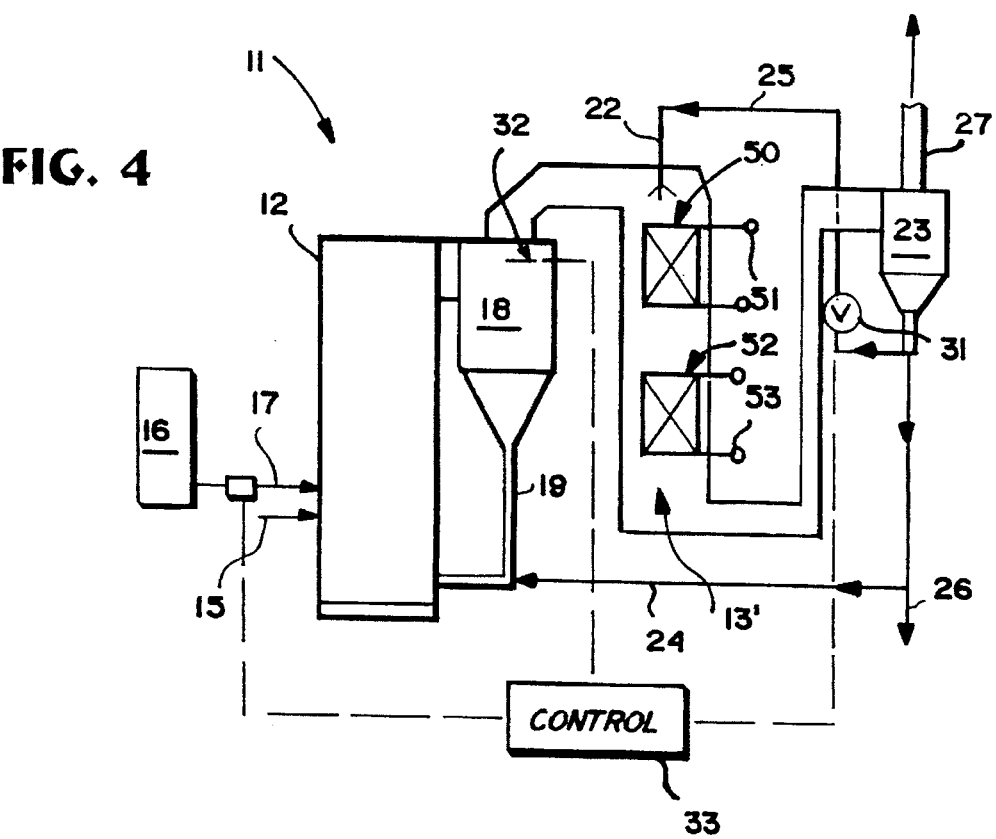
FIG. 4 is a view like that of FIG. 1 only illustrating a different embodiment of a system according to the invention.

FIG. 4 illustrates a system substantially the same as that in FIG. 1 except for the details of the cooler 13', and the elimination of a bed particle feed from the source 16 to the injector 22. In the FIG. 4 embodiment the reactor 12 also is a combustor rather than a gasifier, the exhaust gas passing through the first separator 18 and then to the cooler 13'. The cooler 13' includes a heat exchanger 50 having connections 51 which extend externally of the cooler 13', for example typically for producing steam to drive a steam turbine. A second heat exchanger 52 also may be provided, connected to a turbine, other heat exchangers, and the like via connections 53.

Utilizing the system 11 of FIG. 4, brown coal, municipal waste, sludge, or the like may be combusted. Alkaline deposits in the gas which form on the surfaces of the heat exchangers 50, 52 are removed by injecting particles by injector 22, and/or by controlling the means 32 for affecting particle efficiency removal of the first separator 18, as described with respect to the FIG. 1 embodiment.

Figure 5:
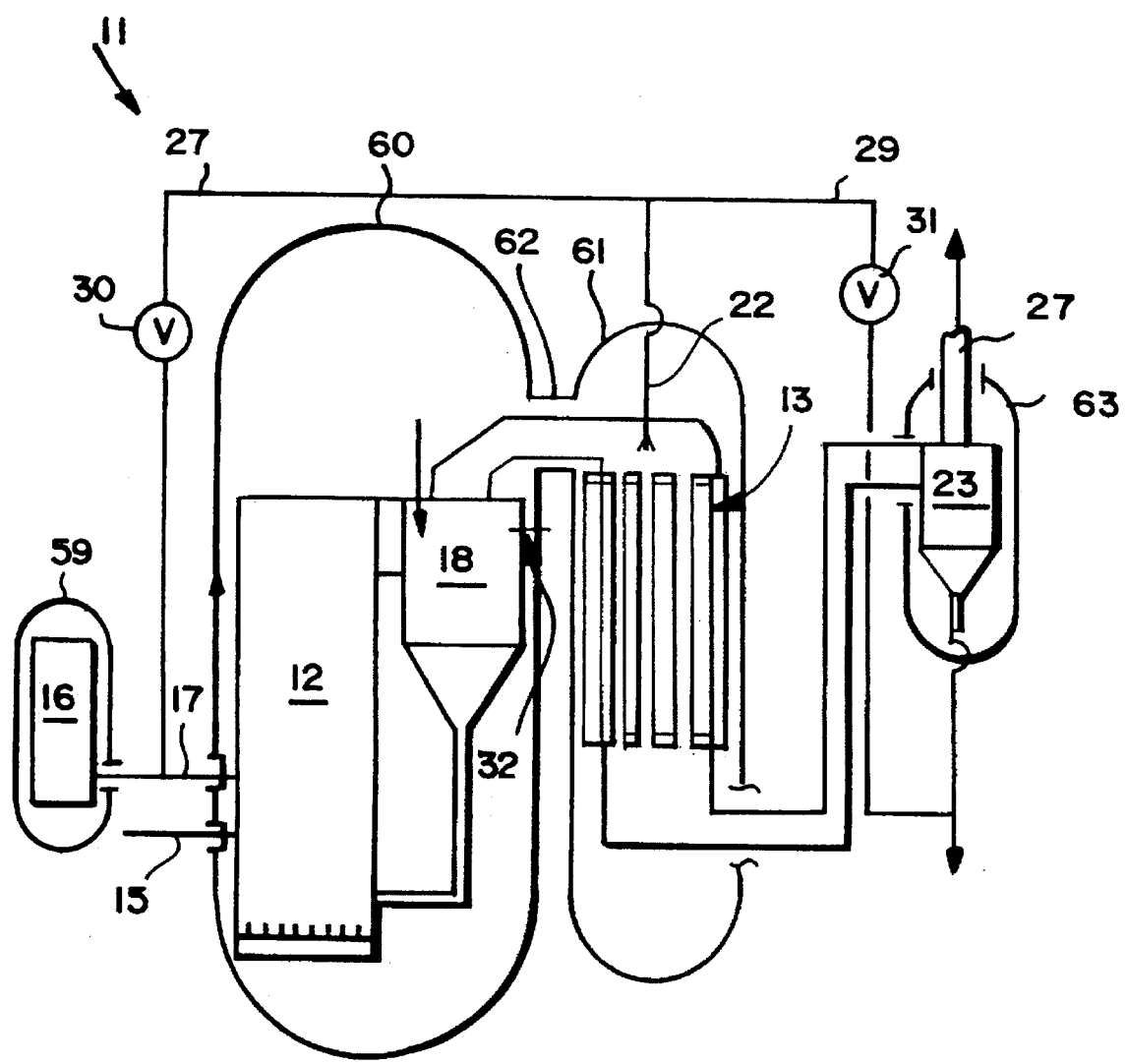
FIG. 5 is a view like that of FIG. 1 only showing an exemplary pressurized reactor system according to present invention.

The FIG. 5 embodiment is substantially the same as the FIG. 1 embodiment except that it comprises a PCFB (pressurized circulating fluidized bed) gasification system. In this case the entire system is operated at superatmospheric pressure, typically 2–50 bar and preferably 2–30 bar. Pressure vessels 59, 60, 61, 62, and 63 are provided surrounding the bed particles sources 16, reactor 12 and separator 18, cooler 13, the duct between the separator 18 and cooler 13, and second separator 23, respectively. In this embodiment the controller 33 is not shown for clarity of illustration.

While the primary action of the particles introduced in or just before the cooler 13, 13' in the practice of the present invention is to effect mechanical removal of deposits, it should also be understood that the solid bed material that comprises the introduced particles may combine with harmful condensable or sticky compounds thereto (e.g. which stick to or condense on the particles), therefore minimizing the deposits that form on the cooling surfaces. Even when pressurized (e.g. particularly in the FIG. 5 embodiment) the solid bed material is at a low enough temperature that at least some condensable compounds, such as tar, condense thereon.

While the invention has been described above with respect to the use of a conventional generally circular configuration cyclone separator for each of the separators 18, 23, it is understood that other cyclone separators can also be utilized, such as the type shown in U.S. Pat. No. 5,281, 398. Also, other types of separators besides cyclone separators may be utilized in which case the particle removal efficiency can be changed in any way that is effective for that particular type of separator. Also for cyclone separators while the means for affecting particle separation efficiency are preferred to be some sort of a fluid or mechanical mechanism for affecting the vortex flows that is extremely simple, other mechanisms can also be provided, such as a deflector in the inlet 36, a restriction in particle discharge 39, etc.

Also while the invention has been described particularly with respect to circulating fluidized beds—which are the preferred embodiment—under some circumstances bubbling beds may be utilized instead. In a bubbling bed less inert material, other particle bed material, is utilized so that the separator 18 may not be necessary. Under these circumstances clearly the introduction of particles can then only come from the separator 23, and/or from the source 16. Even in the circulating fluidized bed embodiment any selected one, or combination, of the particle introduction mechanisms described above may be utilized.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of operating a fluidized bed reactor system comprising a fluidized bed reactor containing solid material particles for reacting fuel, a reactor outlet for gas produced during fuel reaction, and a gas cooler having cooling surfaces and connected to the reactor outlet, said method comprising the steps of:

(a) introducing solid material particles, fluidization medium, and fuel into the reactor to provide a fluidized bed therewithin, where the solid material particles are provided from a source of particles coupled to the reactor;

(b) reacting the fuel material within the bed to produce exhaust gas and discharging the gas from the reactor outlet;

(c) cooling the gas from the reactor outlet in the gas cooler;

(d) cleaning the cooling surfaces of the gas cooler by introducing, before or during step (c), solid material particles into the gas cooler bed directly from the source, so that the solid material particles mechanically dislodge deposits from the cooling surfaces, wherein the solid material particles introduced in step (d) are of the same kind of particles and from the same source as are the particles introduced in step (a); and (e) removing the particles introduced in step (d) from the gas after step (d) and after the gas and particles exit the gas cooler.

2. A method as recited in claim 1 wherein step (d) is practiced at spaced time intervals only.

3. A method as recited in claim 1 wherein step (d) is practiced continuously.

4. A method as recited in claim 1 wherein the source of solid material particles includes a separator particle source of particles removed in step (e) and wherein step (d) is practiced by introducing solid material particles from the separator particle source into the gas just before the gas cooler.

5. A method as recited in claim 4 wherein the source of solid material particles includes a bed particle supply source, and wherein step (d) is also practiced by introducing particles from a bed particle supply source into the gas just before the gas cooler.

6. A method as recited in claim 1 wherein the source of solid material particles include a bed particle supply source, and wherein step (d) is practiced by introducing particles from a bed particle supply source into the gas just before the gas cooler.

7. A method of operating a circulating fluidized bed (CFB) reactor system comprising a fluidized bed CFB reactor containing solid material bed particles for reacting fuel, a reactor outlet for gas produced during fuel reaction, a gas cooler having cooling surfaces and connected to the reactor outlet, and a particle separator between the reactor gas outlet and the gas cooler which separator normally operates at a first particle separation efficiency which does not allow passage of a sufficient number or size of bed particles therethrough to effect gas cooler cleaning; said method comprising the steps of:

(a) introducing solid material bed particles, fluidization medium, and fuel into the reactor to provide a fluidized bed in the reactor;

(b) reacting the fuel material within the bed to produce exhaust gas and discharging the gas from the reactor outlet;

(c) cooling the gas from the reactor outlet in the gas cooler;

(d) cleaning the cooling surfaces of the gas cooler by introducing, before or during step (c), bed particles from the fluidized bed into the gas cooler to mechanically dislodge deposits from the cooling surfaces, wherein the bed particles are introduced by interrupting operation of the particle separator to significantly reduce the particle separation efficiency of the separator to less than the first particle separation efficiency so that a sufficient number and size of bed particles pass from the reactor through the separator and into the gas cooler to effect cleaning of the gas cooler surfaces; and (e) removing the particles from the gas after step (d).

8. A method as recited in claim 7 wherein step (d) is also practiced by introducing particles separated in step (e) into the gas just before the gas cooler.

9. A method as recited in claim 8 wherein step (d) is also practiced by introducing particles from a bed particle supply into the gas just before the gas cooler.

10. A method as recited in claim 7 wherein step (d) is also practiced by introducing particles from a bed particle supply into the gas just before the gas cooler.

11. A method as recited in claim 7 wherein the particle separator is a cyclone separator which produces a vortex, and wherein step (d) is practiced by introducing a fluid stream into the vortex to disrupt the vortex flow and thereby reduce particle separation efficiency of the cyclone separator.

12. A method as recited in claim 7 wherein the particle separator is a cyclone separator which produces a vortex, and wherein step (d) is practiced by introducing a solid object into the vortex to disrupt the vortex flow and thereby reduce particle separation efficiency of the cyclone separator.

13. A method as recited in claim 11 wherein step (d) is practiced by introducing a stream of steam, air, or inert gas into the vortex.

14. A method as recited in claim 7 wherein steps (a)–(e) are practiced at a superatmospheric pressure between about 2–50 bar.

15. A method as recited in claim 1 wherein steps (a)–(e) are practiced at a superatmospheric pressure between about 2–50 bar.

16. A method as recited in claim 15 comprising the further step of pressurizing the bed material to superatmospheric pressure prior to introducing it into the bed and for the practice of step (d).

17. A method as recited in claim 1 wherein step (b) is practiced to produce gas at a temperature above 600° C., and wherein step (c) is practiced to cool the gas to about 400° C.

18. A method as recited in claim 1 wherein step (d) is practiced by introducing inert bed material as the solid material particles.

* * * * *